May 17, 1960 — E. J. ZAHN — 2,936,640

POWER TRANSMISSION BELT

Filed April 14, 1958

INVENTOR.
EDWARD J. ZAHN
BY John E. Reilly
ATTORNEY

United States Patent Office 2,936,640
Patented May 17, 1960

2,936,640

POWER TRANSMISSION BELT

Edward Joseph Zahn, Denver, Colo., assignor to The Gates Rubber Company, Denver, Colo., a corporation of Colorado Application April 14, 1958, Serial No. 728,433

6 Claims. (Cl. 74—232)

The present invention has relation to improvements in power transmission belt construction.

The present invention has more particular relation to an improved belt construction for application to cone or flat pulley drives, or other applications wherein the belt may be subjected to shifting, compression or shearing stresses applied transversely across the top surface and upper portion of the belt.

As an example, in speed changing drives wherein the oppositely tapered driving surfaces of a pair of cone pulleys are connected by a transmission belt, severe shifting and bending forces are imposed on the belt, particularly along the upper and top surface areas. As these forces are applied to the top of the belt, both longitudinal and transverse shearing stresses may be developed. The longitudinal stresses are normally absorbed in the tensile section of the belt; however, the transverse shearing stresses have been found to cause ultimate failure of the belt, generally between the top ply of the belt and the band stock extending along the inside and over the tensile section of the belt. This ultimate failure may generally be attributed to the necessary mode of construction of the belt for the above mentioned application, since the belt must be highly flexible for bending and shifting along the pulleys, and is preferably given a convex driving surface to permit easy and rapid lateral sliding and change in position along the pulley. Due to the above construction, it is therefore advantageous to dispose the free ends, or lap of the cover along the top surface of the belt due to a possible tendency of the ends to peel in direct contact with the pulley surfaces. For this reason, the top surface of the belt can be initially weakened due to the inability of the end portions of the belt to absorb any transverse loading applied thereto. This transverse loading or stress must then be absorbed by the portion underlying the cover ends; however, this underlying portion must also be highly flexible to permit stretching and bending along the outer surface of the belt as it is shifted and driven over the pulley drive. At the same time, the belt will have a tendency to flatten as it rolls over the driving surfaces causing transverse forces along the top tending to open or separate the ends of the cover from the belt and also tending to separate the portion underlying the cover. In addition, the shifting forces and bending imposed on the belt will tend to separate the cover and underlying portion resulting in failure of the belt.

Accordingly, it is an object of the present invention to provide for a cone and flat belt construction capable of greatly increased belt life through its ability to absorb both longitudinal and transverse forces applied thereto without interfering with the normal advantageous operating characteristics of the belt.

It is another object to provide for a belt construction adaptable for cone and flat pulley drives having greatly improved wear characteristics and an ability to retain its shape and relative alignment against forces tending to distort, compress and tear the belt during operation.

It is a further object to prevent top shearing and separation of the members forming the upper surface of a power transmission belt by the incorporation thereinto of an element of unique construction capable of absorbing and evenly distributing transverse forces imposed on the belt, while at the same time maintaining maximum desirable flexibility and increased performance and wear characteristics of the belt.

It is still a further object to provide for a transverse support section for incorporation into a cone belt of the type comprising a centrally disposed tensile section together with a convex driving surface underlying the tensile section and an outer cover having the ends thereof terminating along the top surface of the belt and overlying the tensile section wherein a support section may be so constructed and arranged as to be capable of attaining intimate and tightly adhering contact with the top surface in order to prevent relative movement throughout the upper portion and provide optimum freedom of movement and increased performance and wear characteristics of the belt.

The above and other objects of the present invention will become more apparent from the following detailed description taken together with the accompanying drawings, and which:

Figure 1:
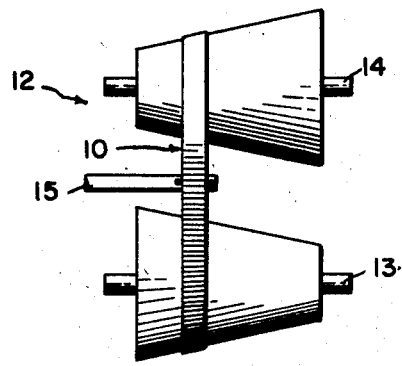
Figure 1 is a plan view illustrating a belt of the present invention in a typical application on a cone pulley drive.
Figure 2:
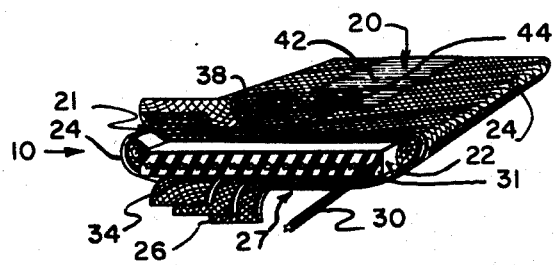
Figure 2 is an isometric view of a form of the present invention illustrating a portion of the belt with fragments of the elements forming the belt being separately extended so as to show their relative construction and arrangement.

There is shown in Figures 1 and 2 a preferred embodiment of the present invention, commonly termed a cone belt 10, as it might be applied for the transmission of power on a cone pulley drive 12. As shown, the cone pulley drive 12 is comprised broadly of a driver shaft 13 and driven shaft 14 in oppositely tapered relation together with a suitable belt shifting fork as represented at 15 for lateral shifting of the belt on the shafts 13 and 14. Changes in position of the belt may be accomplished by shifting the axes of the driver and driven shafts so as to vary the speed of the belt and cause the belt itself to ride up and down the shaft so as to compensate for any change in length thus imposing lateral or shifting forces on the belt. Moreover, in riding in stretched condition over the pulley surfaces, the belt will tend to become flattened and stretched due to the compressive forces imposed thereon. Therefore the above mentioned forces together with fatigue and wear on the belt will be transmitted to the top and upper portions of the belt tending to open and separate the ends of the cover together with the underlying portion.

As an example of the application of the improvement of the present invention to a conventional cone or flat belt arrangement, there are shown in Figure 2 bridge supports 20 and 21 in accordance with the present invention incorporated into the cone belt 10. The basic cone belt 10 may be given any suitable construction but is preferably formed in a manner described in Patent No. 1,969,792 and dated August 14, 1934, being comprised broadly of a core or tensile section 22, reinforced edges 24 on either side of the core together with plies 26 underlying the core so as to shape the driving surface of the belt in the desired form prior to application of an outer cover or wrapper 28 for enclosing the elements of the belt.

Forming the core 22 of this belt are one or more layers of rubberized cords 30 extending throughout the length of the belt and imbedded in a soft rubber cushion layer 31. The cords 30, which define tensile members or the main load carrying members of the belt, may comprise a single layer of a continuous strand, or a number of helically wound strands similar to those commonly used in tire cord construction or a number of layers all in a manner well known in the art. The cushion layer 31, which may preferably be of a gum rubber composition so as to suitably insulate the tensile members 30, forms an undercord cushion layer and an overcord cushion layer or band stock for the cords 30 the layers underlying and overlying respectively the cords 30.

In order to reinforce the sides of the core against shifting, the edges 24 of the belt are preferably formed by the disposition of a rubberized fabric layer 34 extending across the bottom of the core a sufficient width so that the lateral margins may be rolled inwardly and over to form rolled beads defining the reinforcing edges 24 of the belt.

The pulley contacting surface of the belt is shaped so as to provide a convex or rounded driving surface 27. In this way, only a portion of the surface contacts the pulley surfaces at a given time so as to greatly reduce the distortion in the belt and to permit more rapid and easy shifting of the belt across the pulleys. For this purpose the plies 26 are laid up under the core 22 and layer 34, each successive ply extending away from the layer 34 being given a reduced width whereby the sides of the belt will converge inwardly in stepped relation from the layer 34.

The cover 28 may then be applied over the plies 26 with ends 38 of the cover folded over the edges 24 and core 22 into position along the top surface of the belt in contact with the overcord layer. The cover 28 is preferably of fabric composition with the inner surface of the cover being rubberized for adhesion to the inner belt elements during vulcanization, but having an outer skimmed or "bare back" surface so as to provide for easy shifting and change in position on the pulley surfaces. Moreover, in accordance with the present invention, the ends 38 of the cover are buttlapped or terminated short of one another, so as not to overlap, to thereby form an even, flat surface in preparation for the application of the bridge support 20.

In general, the bridge support 20 is designed and disposed in combination with the above described belt construction so as to form a transverse support section of sufficient strength so as to hold and secure the upper section of the belt in place, particularly the ends 38 against opening and separation. At the same time, it is essential that the bridge 20 be of maximum flexibility in the lengthwise direction so as not to impair in any way the desirable operating characteristics of the belt. To this end, the bridge support 20 comprises a rubberized pick or tire cord layer or sheet wherein a plurality of substantially inelastic cords 42 are disposed in closely spaced, parallel alignment transversely across the top of the belt. The cords are spaced the length of the belt, in tightly adhering, intimate contact with the belt cover by means of a highly flexible, thin adhesive layer 44, such as, a gum rubber or other elastomeric materials which after curing achieves the desired contact with the cover. As shown in Figure 2, the bridge support 20 is applied the length of the belt along the outer surface of the cover and overlaying the ends 38 and is given a sufficient width to extend across the ends 38 and therebeyond so as to anchor the bridge securely to the cover. Therefore, so long as the bridge support 20 is securely anchored to the cover with the cords in substantially direct contact therewith, except for a thin film of adhesive, and of sufficient strength to resist any shearing stresses imposed on the cover of the belt, all such stresses will be transmitted into the bridge itself so as to relieve any strain upon the ends of the cover. In the lengthwise direction the cords, being separable one from another and joined only by the adhesive to maintain the proper alignment during vulcanization, will not in any way limit the stretchability and normal bending of the bridge as the belt is driven around the pulley surfaces.

Figure 3:
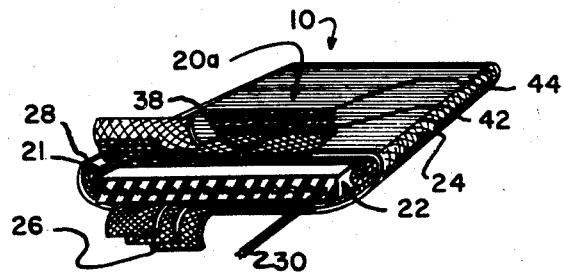
Figure 3 is an isometric view similar to that of Figure 2 showing a modified form of the present invention.

It is evident that the width of the outer bridge 20 may be varied in accordance with the stresses applied to the top surface of the belt. For instance, a narrow bridge construction may be provided as shown in Figure 2 or the width may be extended to form a full bridge construction 20a extending from edge to edge of the belt as shown in Figure 3. With either type construction it has been found not necessary to extend the cross cords completely around the cover surface in order to obtain the necessary connection to the belt members, but with the bridge construction and arrangement as described need only be applied along the top surface without impairing the characteristics of the driving surface and edges thereof.

Generally, the size and strength of the cords 42 need not be as great as that given to the tensile cords 30. Of course, these requirements will be dictated by the amount of transverse stress which the belt will be required to withstand. Furthermore, it has been found that any suitable fibers, such as, a single twisted yarn or 2-play twisted yarn is entirely suitable for the cord construction. The gum stock may then be applied to the cord leaving the cords preferably somewhat exposed with a thin film of rubber surrounding them so as to establish direct contact between the cords and the cover surfaces.

In describing the cord construction as being disposed transversely across the belt it should be understood that the angle formed between the cords and the longitudinal axis of the belt need not be exactly 90 degrees. It has been found that this angle may be varied as much as 10 degrees or more, either way from the normal angle, and nevertheless achieve the necessary holding power with the cover.

There is further shown in Figures 2 and 3 the bridge support 21 forming an inner support layer to co-operate in supporting the outer portion of the belt. As shown, the inner bridge 21 is disposed between the cover 28 and the top surface of the overcord layer and between the reinforcing edges 24. In other words, the inner bridge 21 is terminated just short of the reinforcing edges, preferably so as to be co-extensive with the core 22 and to overlie the cushion layer 31 of the core.

The inner bridge is constructed and arranged, preferably, the same as the outer bridge support 20 having the transversely aligned cords 42 with the adhesive layer 44 insulating and serving to connect the cords securely to the inner surface of the cover and the overcord layer during vulcanization. However, the inner bridge 21 may be constructed of any suitable fabric if desired with the warp fibers aligned transversely along the belt in place of the cords 42 due to the unique way, to be described, in which it co-operates with the outer bridge support 20: The inner bridge will operate in much the same manner as the outer bridge to hold the ends of the cover securely in position, and to hold the cushion layer 31 securely in place and maintain the desired relative alignment between the cover 28 and the cushion layer 31. Moreover, a unique characteristic of the inner bridge 21 is the manner in which it co-operates with the outer bridge 20 under bending and flexing, particularly where compressive forces are applied to the belt tending to flatten it and stretch the top surface thereof. As compressive forces are applied, or under bending and travel around the pulley surfaces, the bridge supports 20 and 21 will tend to press toward one another so as to tightly compress the cover therebetween. This is particularly true along the mid-section of the belt, since the greater the tendency to unduly bend and flatten the belt, the greater will be the pressure exerted upon the cover by the bridge support members to resist such movement. In this manner relative alignment of the members forming the belt is maintained in operation, and any stresses applied to the upper portion of the belt will be absorbed by the bridge support members.

In using either the narrow bridge as in Figure 2 or the full bridge of Figure 3 it will therefore be seen that the bridge support construction and arrangement will provide belts of the type described with greatly increased body and strength without interfering in any way with the performance and normal operating characteristics of the belt. In fact, the bridge construction will serve to improve the performance characteristics of the belt by maintaining proper relative alignment between the elements forming the belt. The bridge construction of the present invention also not only acts to resist bending due to side stresses, but will counteract any tendency of the belt to buckle as it rides over the oppositely tapered pulley surfaces. Furthermore, with the double bridge construction as described the inner bridge will co-operate with the outer bridge in a unique manner to absorb transverse stresses by holding the cushion layer and cover securely in place. In this respect and as noted, it is not necessary to form the inner bridge 21 the same as the outer bridge; the bridge may be composed either of the cross cord construction or of a suitable fabric construction of sufficient body to aid in absorbing stresses, yet of sufficient resilience lengthwise to permit optimum freedom of movement and flexibility of the belt. A further variation may consist in the use of the outer bridge 20 or 20a without the inner bridge 21. Where transverse loads and stresses are not too severe the outer bridge, particularly the full bridge 20a of Figure 3, may be wholly adequate to prevent opening and separation of the cover and cushion layer. In addition, other materials may be utilized in place of the rubberized cord or fabric layers in forming the bridge support members, such as, thin plastic bands aligned to provide the necessary stretch along the length of the belt but being inelastic in a transverse direction, although the construction as described has been found especially unique in attaining the advantages of the present invention. In this connection, the belt itself may be of different materials and construction, or applied to different uses than those described relative to my preferred form.

It is therefore to be understood that the above forms of my invention as herein shown and described are to be taken as preferred embodiments only, and that various modifications and changes in the size, construction and arrangement of the parts may be resorted to without departing from the spirit and scope of my invention as defined by the appended claims.

What is claimed is:

1. In a transmission belt characterized by an outer fabric wrapper with the lateral margins terminating along the top of said belt, a transverse support for the upper portion of said belt comprising: first and second elongate longitudinally elastic sheets defining generally inextensible tensile members disposed substantially perpendicular to the length of said sheets, said first and second sheets overlying and underlying the lateral margins of said wrapper respectively in such a way as to secure said margins and to hold the upper portion of said belt in predetermined alignment against transverse forces imposed thereon.

2. In a transmission belt according to claim 1 wherein said inelastic parallel cords are so arranged along said first and second sheets as to be exposed for direct, tightly adhering engagement with the outer and inner surfaces of the lateral margins of said wrapper.

3. A power transmission belt adaptable for cone pulley drives comprising: a core including a tensile section, a plurality of plies underlying said tensile section disposed so as to define upwardly diverging sides, and a reinforced bead section extending along the sides of said tensile section; an outer fabric wrapper enclosing said core with the lateral ends of said wrapper terminating along the top surface of said belt; and a transverse support section including a fabric layer underlying and interconnecting the ends of said wrapper and an outer rubberized cord layer overlying said ends of said cover and co-extensive with said underlying layer so as to secure the ends of said wrapper under stress against separation and relative movement.

4. A power transmission belt adaptable for cone pulley drives, comprising: a core including a tensile section, a plurality of plies underlying said tensile section disposed so as to define upwardly diverging sides and a reinforced bead section extending along the sides of said tensile section; an outer fabric wrapper enclosing said core with the lateral ends of said wrapper terminating along the top surface of said belt; and a transverse support section including a fabric layer underlying and interconnecting the ends of said cover, and an outer elastomeric layer, including a plurality of transverse cord members spaced continuously along the length thereof, overlying said ends of said wrapper and co-extensive with said underlying layer so as to secure the ends of said wrapper under stress against separation and relative movement.

5. A transmission belt adaptable for cone pulley drives comprising: a centrally disposed core including a tensile section, a plurality of plies underlying said tensile section disposed so as to define upwardly diverging sides and a reinforced bead section extending along each side of said tensile section; an outer fabric cover enclosing said core with the lateral ends of said cover terminating short of one another along the top of said belt; and a transverse support section having an inner elastomeric sheet intermediate the top surface of said core and the undersurface of said cover with the ends of said sheet terminating adjacent said bead sections, and an outer elastomeric sheet adhering to the outer surface of said cover along the top of said belt, said sheets incorporating a plurality of closely spaced, transversely disposed inelastic cord members extending the width and thickness of said sheets for absorbing stresses and securing the elements of said belt against relative movement and separation.

6. A power transmission belt for use with cone pulley drives, comprising: a core including a tensile section, a plurality of plies underlying said tensile section disposed so as to define upwardly divergent sides, and a reinforced bead section extending along the sides of said tensile section; an outer fabric wrapper enclosing said core with the terminal ends of said wrapper extending along the top surface of said belt; and a transverse support section defined by a thin elastomeric sheet extending continuously along the length of the top surface of said belt and with the lateral ends of the sheet terminating on the top surface short of the reinforced bead section, said sheet incorporating a plurality of inelastic, transverse cords disposed in closely spaced parallel alignment in direct contact with the top surface of said belt.

References Cited in the file of this patent

UNITED STATES PATENTS

| 1,969,792 | Gates | Aug. 14, 1934 |
| 2,578,885 | Huff | Dec. 18, 1951 |
| 2,737,468 | Waugh | Mar. 6, 1956 |

FOREIGN PATENTS

| 347,075 | Great Britain | Apr. 23, 1931 |
| 426,684 | Great Britain | Apr. 8, 1935 |
| 332,161 | Italy | Nov. 25, 1935 |